(12) United States Patent
Ono

(10) Patent No.: US 12,743,901 B2
(45) Date of Patent: Sep. 22, 2026

(54) INFORMATION PROCESSING DEVICE, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Takanori Ono, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 65 days.

(21) Appl. No.: 17/896,805

(22) Filed: Aug. 26, 2022

(65) Prior Publication Data

US 2023/0306764 A1 Sep. 28, 2023

(30) Foreign Application Priority Data

Mar. 23, 2022 (JP) ................................ 2022-047394

(51) Int. Cl.
*G06V 30/12* (2022.01)
*G06V 30/19* (2022.01)

(52) U.S. Cl.
CPC ........ *G06V 30/127* (2022.01); *G06V 30/1916* (2022.01)

(58) Field of Classification Search
CPC ................................................ G06V 30/00–43
See application file for complete search history.

(56) References Cited

U.S. PATENT DOCUMENTS 9,659,224 B1 * 5/2017 Cole .................... G06V 10/809
11,216,695 B2 1/2022 Oishi
2008/0304698 A1 * 12/2008 Rasmussen ............ G06V 30/32 382/100
2009/0228273 A1 * 9/2009 Wang ...................... G10L 15/22 704/235
2013/0004076 A1 * 1/2013 Koo ...................... G06F 18/254 382/176
2017/0091596 A1 * 3/2017 Tsutsui .................. G06F 40/279
2019/0294904 A1 * 9/2019 Kimura ................ G06V 30/413
2021/0099586 A1 * 4/2021 Tanaka ............... H04N 1/00331
2021/0182587 A1 * 6/2021 Akiyama .................. G06T 5/70
(Continued)

FOREIGN PATENT DOCUMENTS

JP H05-314303 A 11/1993
JP H06-36067 A 2/1994
(Continued)

OTHER PUBLICATIONS

Aug. 28, 2023 Extended Search Report issued in European Patent Application No. 22199936.0.
(Continued)

*Primary Examiner* — Sean T Motsinger
(74) *Attorney, Agent, or Firm* — Oliff PLC

(57) ABSTRACT

An information processing device includes a processor configured to: successively execute two or more processes as processes for reading character information and converting the character information into data, and thereby output processing results; receive an operation by a user with respect to the outputted processing results; and display, on a display device and in response to the operation, a progress of the individual processes among the two or more processes leading up to the processing results.

18 Claims, 14 Drawing Sheets

(56) References Cited

U.S. PATENT DOCUMENTS

| | | | | |
|---|---|---|---|---|
| 2021/0224529 | A1* | 7/2021 | Tanaka | G06V 30/412 |
| 2023/0274565 | A1* | 8/2023 | Wang | G06V 10/96 |
| | | | | 382/178 |
| 2023/0306764 | A1* | 9/2023 | Ono | G06V 30/127 |

FOREIGN PATENT DOCUMENTS

| | | | |
|---|---|---|---|
| JP | H07-13991 | A | 1/1995 |
| JP | 2016-015007 | A | 1/2016 |
| JP | 2020-102166 | A | 7/2020 |
| JP | 2020-134977 | A | 8/2020 |
| JP | 2020-170465 | A | 10/2020 |
| JP | 2021-056750 | A | 4/2021 |

OTHER PUBLICATIONS

Nov. 11, 2025 Office Action issued in Japanese Patent Application No. 2022-047394.

Jun. 16, 2026 Office Action issued in European Patent Application No. 22199936.0.

* cited by examiner

FIG. 3

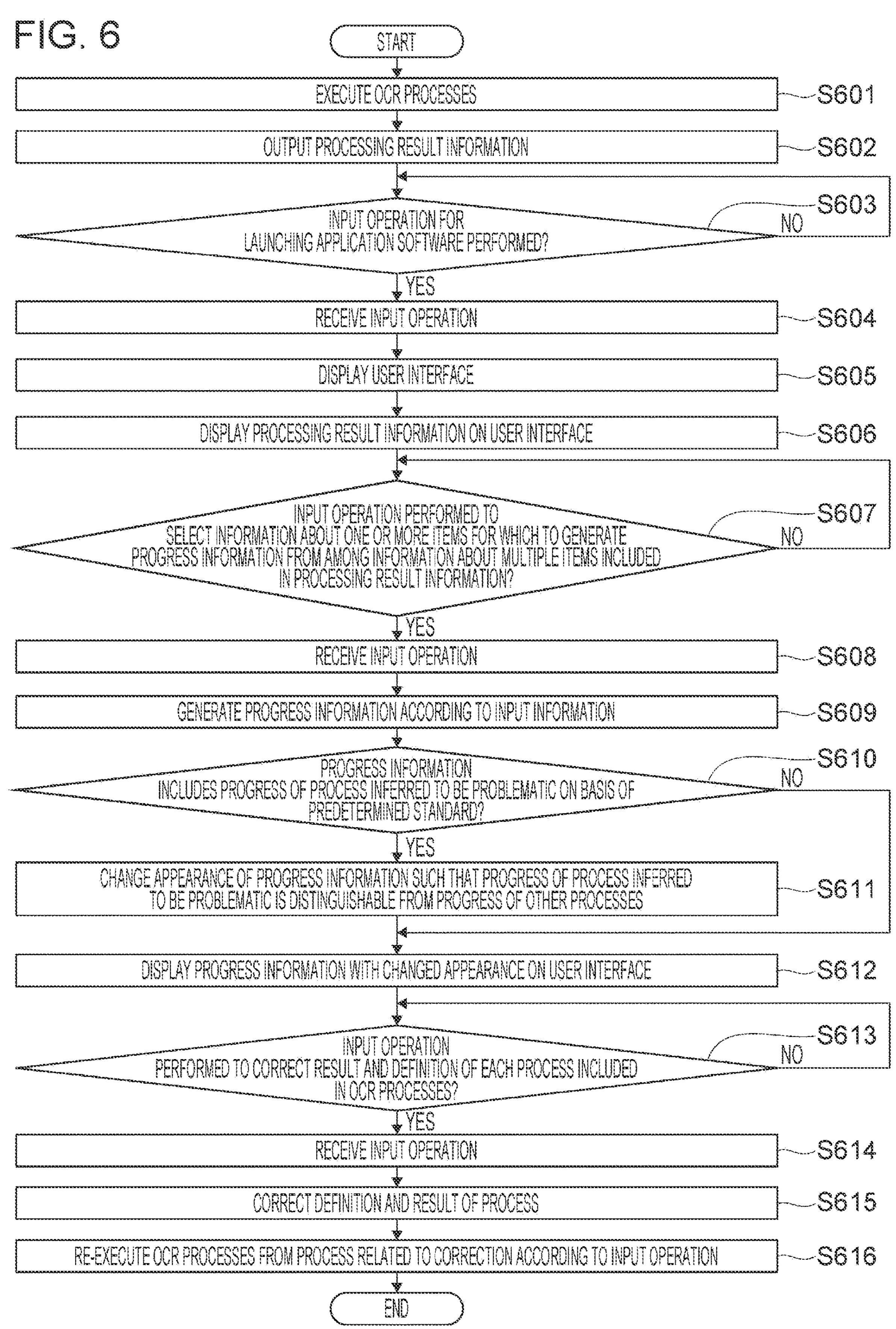
FIG. 6
START
EXECUTE OCR PROCESSES
S601
OUTPUT PROCESSING RESULT INFORMATION
S602
INPUT OPERATION FOR LAUNCHING APPLICATION SOFTWARE PERFORMED?
S603
NO
YES
RECEIVE INPUT OPERATION
S604
DISPLAY USER INTERFACE
S605
DISPLAY PROCESSING RESULT INFORMATION ON USER INTERFACE
S606
INPUT OPERATION PERFORMED TO SELECT INFORMATION ABOUT ONE OR MORE ITEMS FOR WHICH TO GENERATE PROGRESS INFORMATION FROM AMONG INFORMATION ABOUT MULTIPLE ITEMS INCLUDED IN PROCESSING RESULT INFORMATION?
S607
NO
YES
RECEIVE INPUT OPERATION
S608
GENERATE PROGRESS INFORMATION ACCORDING TO INPUT INFORMATION
S609
PROGRESS INFORMATION INCLUDES PROGRESS OF PROCESS INFERRED TO BE PROBLEMATIC ON BASIS OF PREDETERMINED STANDARD?
S610
NO
YES
CHANGE APPEARANCE OF PROGRESS INFORMATION SUCH THAT PROGRESS OF PROCESS INFERRED TO BE PROBLEMATIC IS DISTINGUISHABLE FROM PROGRESS OF OTHER PROCESSES
S611
DISPLAY PROGRESS INFORMATION WITH CHANGED APPEARANCE ON USER INTERFACE
S612
INPUT OPERATION PERFORMED TO CORRECT RESULT AND DEFINITION OF EACH PROCESS INCLUDED IN OCR PROCESSES?
S613
NO
YES
RECEIVE INPUT OPERATION
S614
CORRECT DEFINITION AND RESULT OF PROCESS
S615
RE-EXECUTE OCR PROCESSES FROM PROCESS RELATED TO CORRECTION ACCORDING TO INPUT OPERATION
S616
END

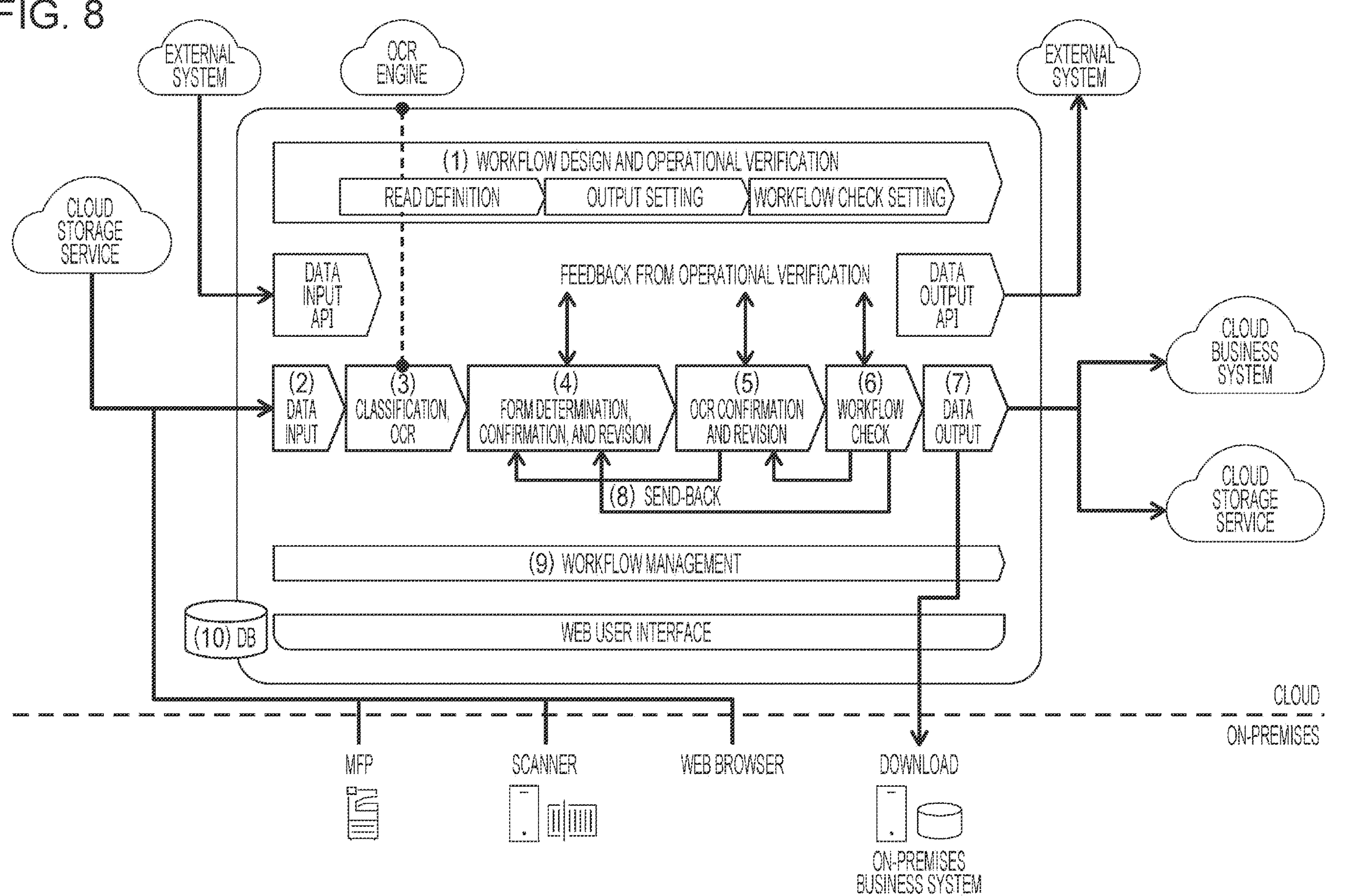
FIG. 8
EXTERNAL SYSTEM
OCR ENGINE
EXTERNAL SYSTEM
CLOUD STORAGE SERVICE
(1) WORKFLOW DESIGN AND OPERATIONAL VERIFICATION
READ DEFINITION
OUTPUT SETTING
WORKFLOW CHECK SETTING
DATA INPUT API
FEEDBACK FROM OPERATIONAL VERIFICATION
DATA OUTPUT API
CLOUD BUSINESS SYSTEM
(2) DATA INPUT
(3) CLASSIFICATION, OCR
(4) FORM DETERMINATION, CONFIRMATION, AND REVISION
(5) OCR CONFIRMATION AND REVISION
(6) WORKFLOW CHECK
(7) DATA OUTPUT
CLOUD STORAGE SERVICE
(8) SEND-BACK
(9) WORKFLOW MANAGEMENT
(10) DB
WEB USER INTERFACE
CLOUD
ON-PREMISES
MFP
SCANNER
WEB BROWSER
DOWNLOAD
ON-PREMISES BUSINESS SYSTEM

FIG. 9

JOB NAME: JOB 026

| RECORD/ COLUMN NAME | NAME | PRODUCT | PRICE | CODE-1 | CODE-2 |
|---|---|---|---|---|---|
| RECORD 001 | AAA TARO | A | 1,500 | XP00102 | FF57 |
| RECORD 002 | AAA HANAKO | S | 12,000 | XP11099 | DD32 |
| RECORD 003 | AAA JIRO | D-Centre | 324,000 | a02 | XY44 |
| RECORD 004 | AAA SABURO | C | 2,400 | XP2534 | OX32 |
| RECORD 005 | AAA SHIRO | K | 32,200,400 | XP12334 | B574 |

B1
JOB 026
B2
RECORD 003
FORM IMAGE
RECOGNITION RESULT
DATA CORRECTION
DATA CORRECTION RESULT
CONFIRMED/ REVISED RESULT
DATA CONVERSION
OUTPUT RESULT
AAA JIRO
AAA JIRO
AAA JIRO
AAA JIRO
[CANDIDATE 01] D-Centre
D-Centre
D-Cento
CORRECTION 001
0.75
[CANDIDATE 02] D-Works
D-Centre
1.0
CONVERSION 001
D-Centre
324,000
C5150
C515o
CORRECTION 002
0.8
C5150
C5150
1.0
CONVERSION 002
0.0
a02
XY44
XY44
XY44
XY44
P1
P2
P3
P4
P5
P6
P7

FIG. 12

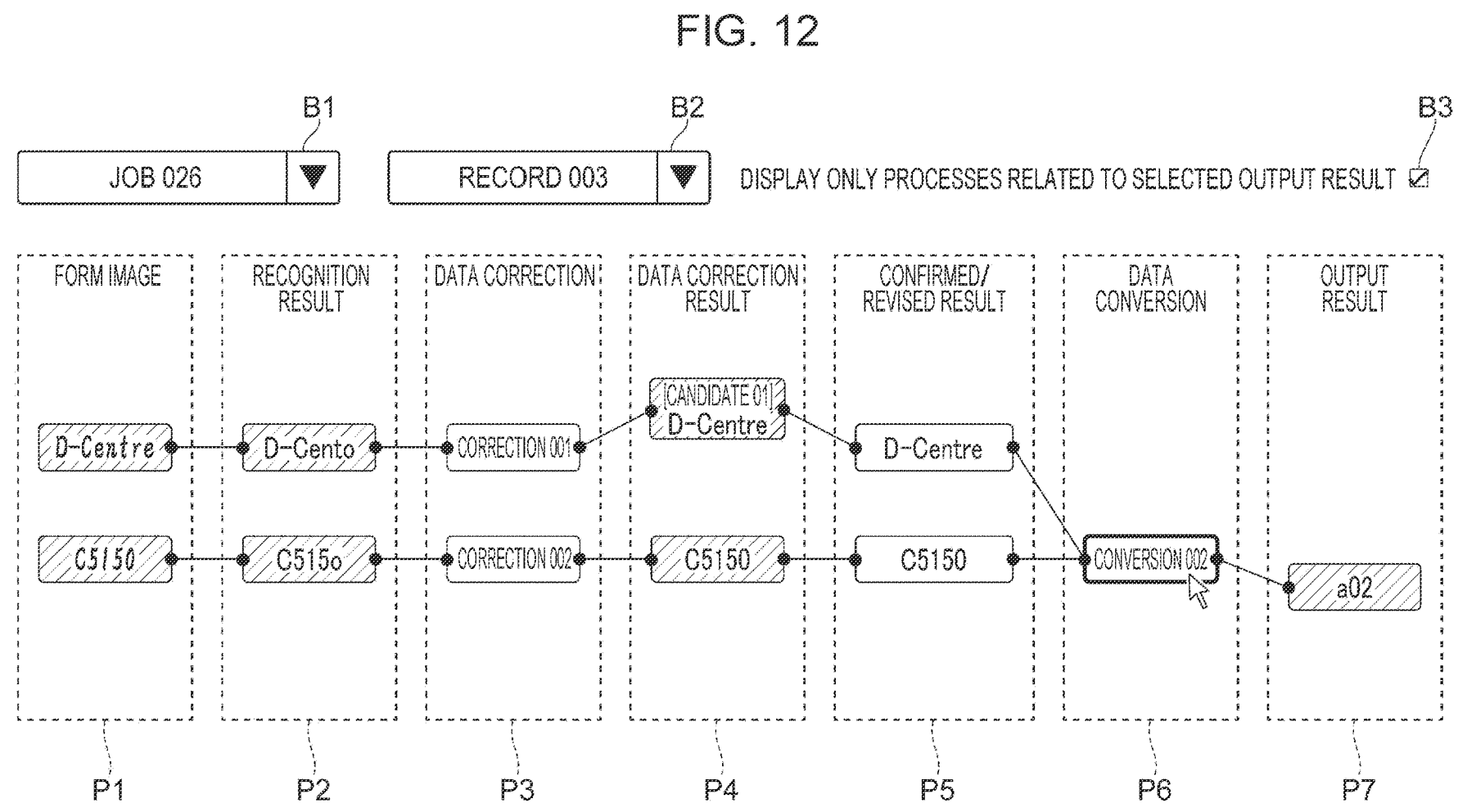

JOB 026
B1
RECORD 003
B2
DISPLAY ONLY PROCESSES RELATED TO SELECTED OUTPUT RESULT
B3

FORM IMAGE
D-Centre
C5150
P1

RECOGNITION RESULT
D-Cento
C515o
P2

DATA CORRECTION
CORRECTION 001
CORRECTION 002
P3

DATA CORRECTION RESULT
[CANDIDATE 01] D-Centre
C5150
P4

CONFIRMED/ REVISED RESULT
D-Centre
C5150
P5

DATA CONVERSION
CONVERSION 002
P6

OUTPUT RESULT
a02
P7

CONVERSION 002 ▼

A2

TWO-STEP VERIFICATION

D-Centre

C5150 a02

DERIVATION PATH: D-Centre → List02 → C5150 → a02

A3

T1

TABLE NAME: table01

| PRODUCT NAME | CODE TABLE |
|---|---|
| D-Works | List01 |
| D-Centre | List02 |
| A | List03 |
| S | List04 |
| C | List05 |

B12

CORRECT

T2

TABLE NAME: List02

| SERIAL NUMBER | PRODUCT CODE |
|---|---|
| C1100 | XP0040 |
| C1200 | XP0037 |
| C5150 | a02 |
| C5250 | XP4144 |
| C5350 | XP3237 |

B13

CORRECT

BACK

B16

SAVE AND GO BACK TO XXX

B14

SAVE AND RE-EXECUTE

B15

A1
CONVERSION 002
B11
A2
TWO-STEP VERIFICATION
D-Centre
C5150
XP2459
DERIVATION PATH: D-Centre → List02 → C5150 → XP2459
A3
TABLE NAME: table01
T1
PRODUCT NAME
CODE TABLE
D-Works
List01
D-Centre
List02
A
List03
S
List04
C
List05
B12
CORRECT
TABLE NAME: List02
T2
SERIAL NUMBER
PRODUCT CODE
C1100
XP0040
C1200
XP0037
C5150
XP2459
C5250
XP4144
C5350
XP3237
B13
CORRECT
BACK
B16
SAVE AND GO BACK TO XXX
B14
SAVE AND RE-EXECUTE
B15

INFORMATION PROCESSING DEVICE, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-047394 filed Mar. 23, 2022.

BACKGROUND

(i) Technical Field

The present disclosure relates to an information processing device, an information processing method, and a non-transitory computer readable medium.

(ii) Related Art

A technology that reads character information recorded on a medium such as a paper and converts the character information into data is known (Japanese Unexamined Patent Application Publication No. 2020-170465 and No. 2020-102166, for example).

SUMMARY

In such a technology, a series of processes is executed until final data is obtained from reading character information by optical character recognition/reader (OCR), and in several stages of the multiple processes, the suitability of the processes is determined and corrected, as appropriate. However, in the series of processes until character information is converted into data, if there is an error in an obtained processing result after the data of the processing result is obtained, identifying the process causing the error from among the series of processes is difficult.

Aspects of non-limiting embodiments of the present disclosure relate to making it possible to confirm the suitability of the process at each stage in a series of OCR processes by working backward through the series of processes after the entire processing sequence has completed, as compared to a configuration in which the suitability of each process is determined individually at each stage of the series of processes.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: successively execute two or more processes as processes for reading character information and converting the character information into data, and thereby output processing results; receive an operation by a user with respect to the outputted processing results; and display, on a display device and in response to the operation, a progress of the individual processes among the two or more processes leading up to the processing results.

BRIEF DESCRIPTION OF THE DRAWINGS

An exemplary embodiment of the present disclosure will be described in detail based on the following figures, wherein:

FIG. 3 is a diagram illustrating an example of a hardware configuration of a management server as an information processing device to which an exemplary embodiment is applied;

FIG. 6 is an example of a flowchart illustrating a flow of processes in a user terminal;

FIG. 8 is a diagram illustrating a specific example of a service to which an exemplary embodiment of the present disclosure is applied;

FIG. 9 is a diagram illustrating a specific example of a user interface displayed on a display unit of a user terminal as a display device;

FIG. 12 is a diagram illustrating a specific example of a user interface displayed on a display unit of a user terminal as a display device;

FIG. 13 is a diagram illustrating a specific example of a user interface displayed on a display unit of a user terminal as a display device.

DETAILED DESCRIPTION

Hereinafter, an exemplary embodiment of the present disclosure will be described in detail and with reference to the attached drawings.

(Configuration of Information Processing System)

Figure 1:
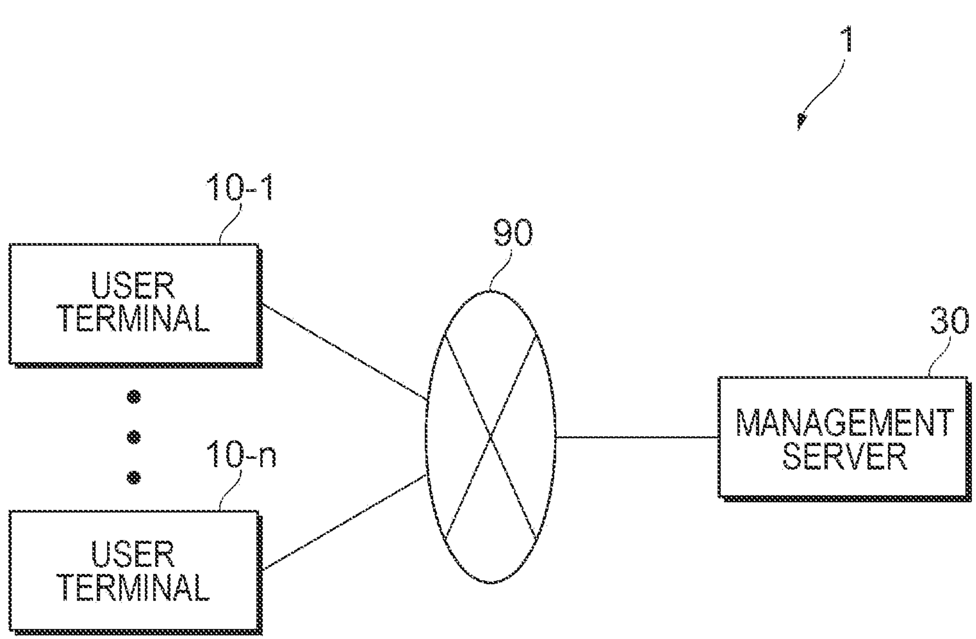
FIG. 1 is a diagram illustrating an example of an overall configuration of an information processing system including user terminals as information processing devices to which an exemplary embodiment is applied.

FIG. 1 is a diagram illustrating an example of an overall configuration of an information processing system 1 including user terminals 10-1 to **10-*n* (where n is an integer equal to or greater than 2) as information processing devices to which an exemplary embodiment is applied. The information processing system 1 is formed by connecting the user terminals 10-1 to 100*n* to a management server 30 through a network 90. The network 90 is, for example, a local area network (LAN), the Internet, or the like. Note that the user terminals 10-1 to 10-*n* will be collectively referred to as the user terminal 10** when not being distinguished individually.

The user terminal 10 is an information processing device such as a personal computer, a smartphone, or a tablet operated by a user. The user terminal 10 performs a series of processes (hereinafter referred to as "OCR processes") from reading character information to converting the character information into data. The OCR processes include two or more processes. A definition is established for each process included in the OCR processes, and each process is executed on the basis of the definition.

The user terminal 10 outputs the individual processing results from each process included in the executed OCR processes, and displays the outputted information as "processing result information" on a user interface. Thereafter, if the user performs an input operation on the processing result information, the progress of individual processes among the processes leading up to the processing result is displayed as "progress information" on a user interface in response to the input information. In other words, whereas the processing result information is information in which the individual processing results from two or more processes included in the OCR processes are outputted individually and irrespectively of the preceding and succeeding processing results, the progress information is information in which the individual processing results from two or more processes included in the OCR processes are outputted as an overall flow associated with preceding and succeeding processing results.

Figure 2:
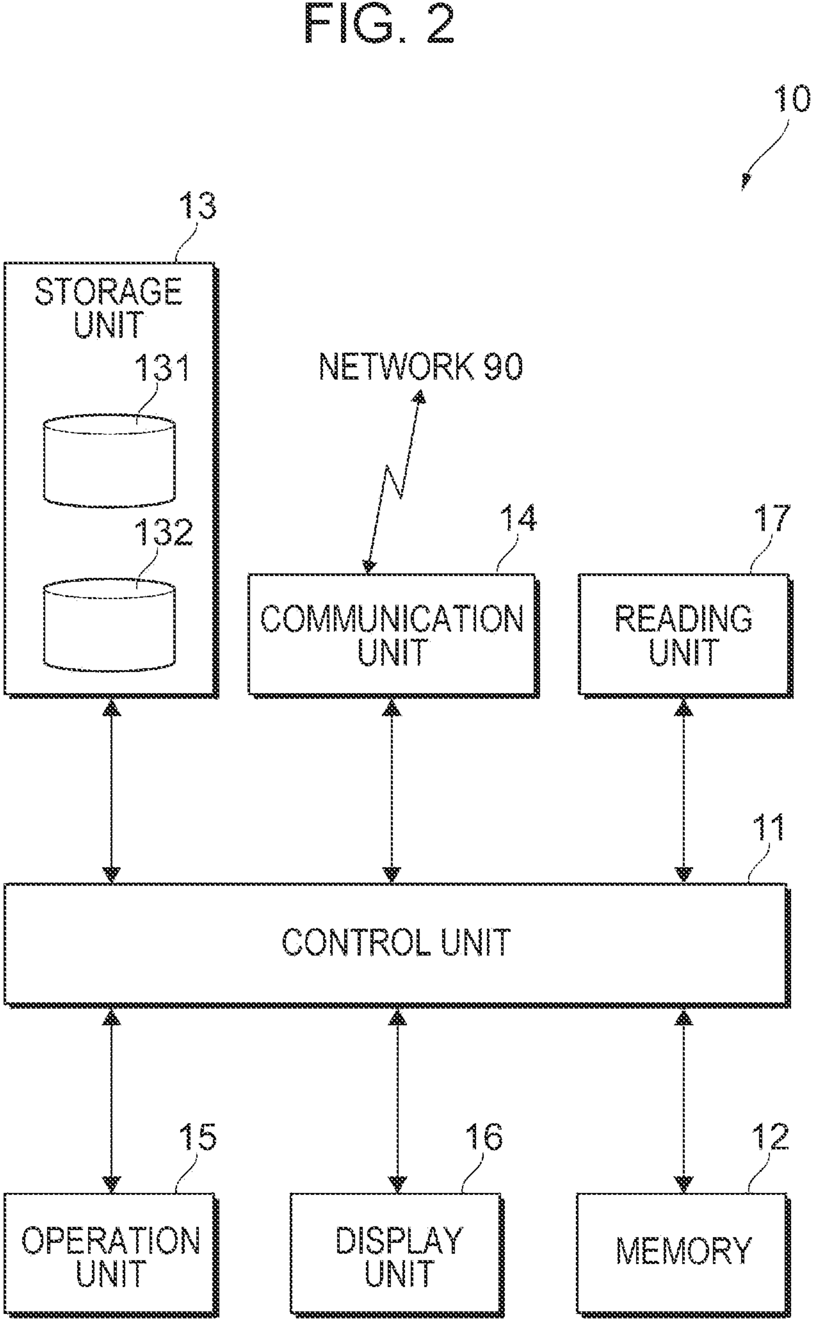
FIG. 2 is a diagram illustrating an example of a hardware configuration of a user terminal as an information processing device to which an exemplary embodiment is applied.

Examples of the two or more processes included in the OCR processes include processes performed by multiple users, processes performed by multiple central processing units (CPUs; see the description of the control unit 11 in FIG. 2, and processes performed by a user and a CPU. Among these, examples of two or more processes performed by multiple users include: the case where two or more processes are performed serially by different users, such as when one user performs confirmation and revision processes, after which another user performs confirmation and revision processes, also referred to as double-checking; the case where two or more users each perform confirmation and revision processes at the same time in parallel; and the case where two or more users each perform confirmation and revision processes at the same time in parallel, after which the results are checked against each other.

Also, among the processes included in the OCR processes, examples of two or more processes performed by multiple CPUs include the case where an OCR process based on a first dictionary and an OCR process based on a second dictionary are each performed. Also, among the processes included in the OCR processes, examples of two or more processes performed by a user and a CPU include a combination of a process by a CPU with a process by a user. Here, examples of a "combination" include the combination of a correction control process by a CPU with confirmation and revision processes by a user.

The management server 30 is an information processing device acting as a server that manages the information processing system 1 as a whole. The management server 30 may perform some of the above processes by the user terminal 10. For example, in the case where the management server 30 performs some of the OCR processes, the management server 30 performs a process of converting information read by the user terminal 10 (hereinafter referred to as "read information") into data, a process of transmitting the individual processing results from two or more executed processes to the user terminal 10 as processing result information, and the like.

Also, in the case where the management server 30 performs some of the OCR processes, if input information pertaining to processing result information is transmitted from the user terminal 10, the management server 30 generates progress information in response to the input information. In this way, in the case where the management server 30 performs some of the above processes by the user terminal 10, information inputted into the user terminal 10 by a user input operation and information outputted as the result of respective processes by the user terminal 10 and the management server 30, information acquired from an external source not illustrated, and the like are transmitted and received between the management server 30 and the user terminal 10. Note that details regarding these processes by the management server 30 will be described later.

The configuration of the information processing system 1 described above is an example, and it is sufficient if functions for achieving the above processes are provided in the information processing system 1 as a whole. Consequently, some or all of the functions for achieving the above processes may be allotted or achieved cooperatively within the information processing system 1. In other words, some or all of the functions of the user terminal 10 may also be configured as functions of the management server 30, and some or all of the functions of the management server 30 may also be configured as functions of the user terminal 10. Moreover, some or all of the respective functions of the user terminal 10 and the management server 30 included in the information processing system 1 may also be delegated to another server or the like not illustrated. This arrangement makes it possible to accelerate processing by the information processing system 1 as a whole and also cause processes to complement one another.

(Hardware Configuration of User Terminal)

FIG. 2 is a diagram illustrating an example of a hardware configuration of the user terminal 10 as an information processing device to which an exemplary embodiment is applied. The user terminal 10 includes a control unit 11, a memory 12, a storage unit 13, a communication unit 14, an operation unit 15, a display unit 16, and a reading unit 17. These units are connected by a data bus, an address bus, a Peripheral Component Interconnect (PCI) bus, and the like.

The control unit 11 is a processor that controls the functions of the user terminal 10 through the execution of various software such as an operation system (OS; basic software) and application software. The control unit 11 includes a CPU, for example. The memory 12 is a storage area storing various software, data used in the execution of the software, and the like, and is also used as a work area when performing computations. The memory 12 includes random access memory (RAM), for example.

The storage unit 13 is a storage area that stores information such as input data for various software and output data from various software. The storage unit 13 includes a device such as a hard disk drive (HDD), a solid-state drive (SSD), or a semiconductor memory used to store programs and various settings data, for example. The storage unit 13 contains databases storing various information, such as a character string DB 131 storing various character strings, conversion tables, and the like, and a processing result DB 132 storing processing result information.

The communication unit 14 transmits and receives data with the management server 30 and external equipment over the network 90. The operation unit 15 includes a keyboard, a mouse, and mechanical buttons and switches, for example, and receives input operations. The operation unit 15 also includes an operation image displayed on the display unit 16. The operation unit 15 also includes a touch sensor that is integrated with the display unit 16 to form a touch panel. The display unit 16 includes a liquid crystal display (LCD) or an organic light-emitting diode (OLED) display used to display information, for example, and displays image, text data, and the like. A user interface is displayed on the display unit 16 as a display device.

The reading unit 17 reads an image recorded on a medium (for example, a form or the like) such as paper as the recording medium. The reading unit 17 includes, for example, a charge-coupled device (CCD) scanner in which light from a light source is radiated onto a document and the reflected light therefrom is focused by a lens and sensed by a CCD or a contact image sensor (CIS) scanner in which light from LED light sources is successively radiated onto a document and the reflected light therefrom is sensed by a CIS.

(Hardware Configuration of Management Server)

Figure 3:
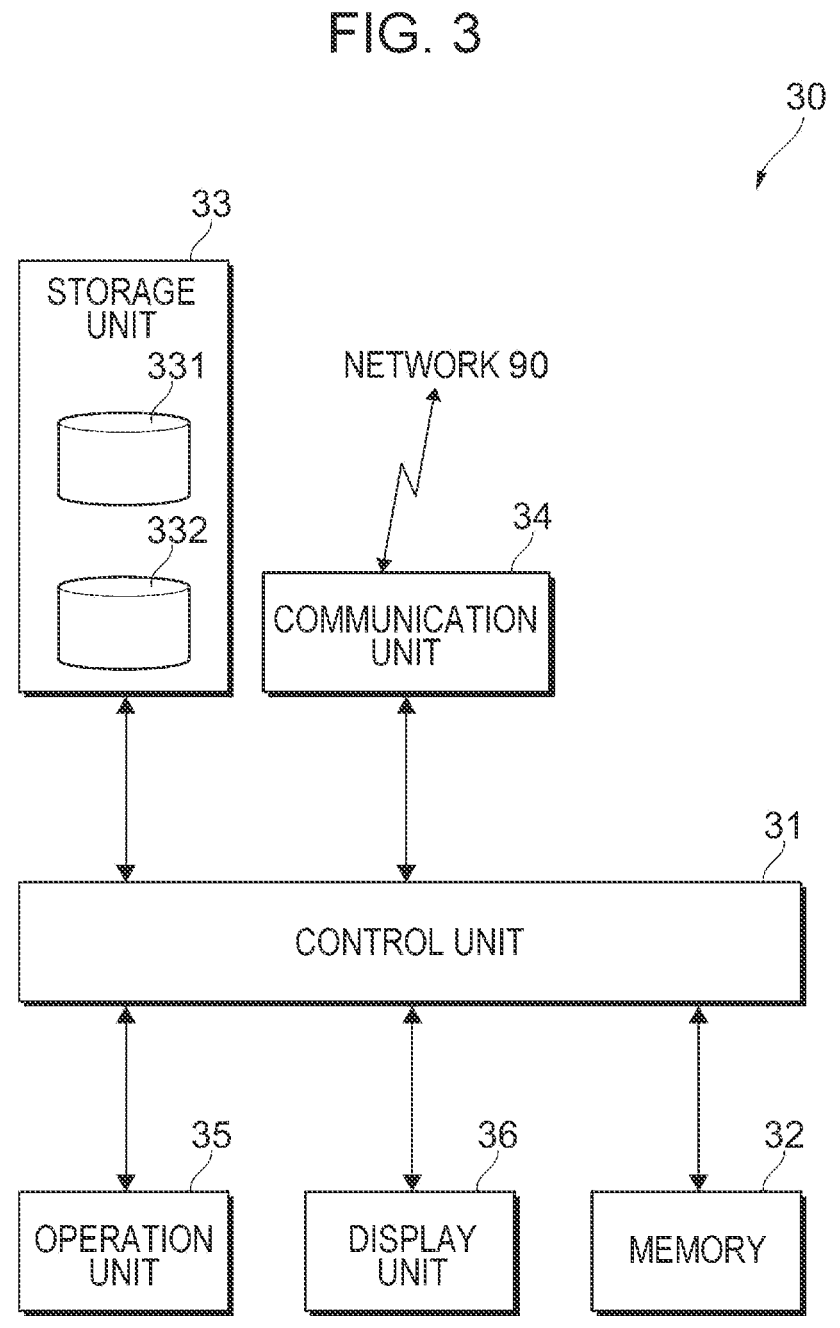

FIG. 3 is a diagram illustrating an example of a hardware configuration of the management server 30 as an information processing device to which an exemplary embodiment is applied. The management server 30 has a hardware configuration corresponding to each of the control unit 11, memory 12, storage unit 13, communication unit 14, operation unit 15, and display unit 16 in the hardware configuration of the user terminal 10 in FIG. 2. In addition, these units are connected by a data bus, an address bus, a PCI bus, and the like.

Namely, the management server 30 includes a control unit 31 formed from a processor such as a CPU, a memory 32 formed as a storage area in RAM or the like, and a memory 32 formed as a storage area in an HDD, an SSD, a semiconductor memory, or the like. The storage unit 33 contains databases storing various information, such as a character string DB 331 storing various character strings, conversion tables, and the like, and a processing result DB 332 storing processing result information. The management server 30 also includes a communication unit 34 that transmits and receives data with the user terminal 10 and external equipment over the network 90. Additionally, the management server 30 includes an operation unit 35 including a keyboard, a mouse, a touch panel, or the like, and a display unit 36 including an LCD display, an OLED display, or the like.

(Functional Configuration of Control Unit in User Terminal)

Figure 4:
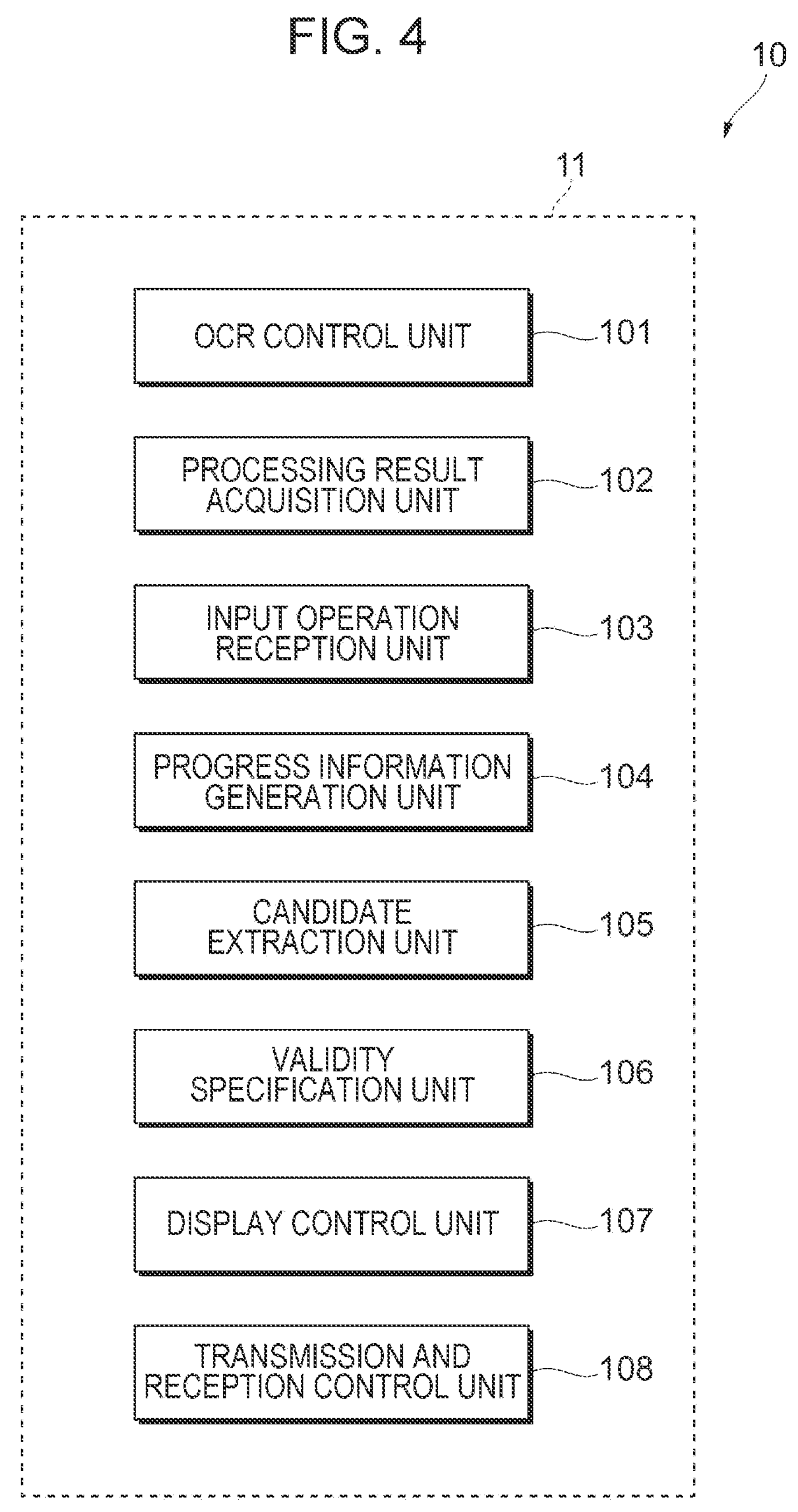
FIG. 4 is a diagram illustrating an example of a functional configuration of a control unit in a user terminal.

FIG. 4 is a diagram illustrating an example of a functional configuration of the control unit 11 in the user terminal 10. The control unit 11 of the user terminal 10 functions as an OCR control unit 101, a processing result acquisition unit 102, an input operation reception unit 103, a progress information generation unit 104, a candidate extraction unit 105, a validity specification unit 106, a display control unit 107, and a transmission and reception control unit 108.

The OCR control unit 101 controls the execution of OCR processes. As described above, the OCR processes include two or more processes. As described above, examples of the processes included in the OCR processes include processes performed by multiple users, processes performed by multiple CPUs, and processes performed by a user and a CPU. For instance, a process for correcting intermediate data acquired as the result of a process in a preceding stage (hereinafter referred to as a "correction process") and a process for converting intermediate data acquired as the result of a process in a preceding stage into other data using a database (hereinafter referred to as a "conversion process") are both examples of processes included in the OCR processes.

Control of the correction process involves the OCR control unit 101 controlling a correction performed by a CPU in accordance with predetermined rules and controlling a revision in which a character string in intermediate data acquired as the result of a process in a preceding stage is replaced with a character string inputted by a user input operation. The OCR control unit 101 also controls the correction of the results of processes and definitions used in the OCR processes on the basis of user input operations. In this case, after the result of a process and a definition used in the OCR processes are corrected according to a user input operation, the OCR control unit 101 may control the re-execution of the OCR processes from the processes related to the correction.

The processing result acquisition unit 102 acquires individual processing results from the two or more processes included in the OCR processes executed under control by the OCR control unit 101. The processing results include information containing multiple items. The processing results acquired by the processing result acquisition unit 102 are stored and managed as processing result information in a database. Specifically, the acquired processing result information is stored and managed in the processing result DB 132 of the storage unit 13 (see FIG. 2).

The input operation reception unit 103 receives user input operations. Examples of user input operations include touch operations performed with a finger, mouse operations, and the like. The input operation reception unit 103 also receives input operations for launching application software and causing a user interface to be displayed on the display unit 16 (see FIG. 2).

In addition, the input operation reception unit 103 receives user input operations with respect to processing result information displayed on the user interface. As an example of a user input operation, the input operation reception unit 103 receives an input operation for selecting information about one or more items for which progress information is to be generated from among the information containing multiple items included in the processing result information. The input operation reception unit 103 also receives user input operations with respect to progress information about processes displayed on the user interface from among the processes included in the OCR processes. The input operation reception unit 103 also receives input operations for correcting the results of processes and the definitions used in each process included in the OCR processes.

The progress information generation unit 104 generates progress information about two more processes leading up to a processing result in response to input information received as input by the input operation reception unit 103. The candidate extraction unit 105 extracts, from information stored in a database, one or more correction candidates to be displayed on the user interface as progress information about the correction process. Also, the candidate extraction unit 105 extracts, from information stored in a database, one or more conversion candidates to be displayed on the user interface as progress information about the conversion process. For example, the candidate extraction unit 105 extracts one or more correction candidates or conversion candidates from the information stored in the character string DB 131 of the storage unit 13.

In the case where a correction candidate or a conversion candidate is extracted by the candidate extraction unit 105, the validity specification unit 106 specifies the validity of the correction candidate or conversion candidate. The validity of a correction candidate or conversion candidate is determined on the basis of a predetermined standard. Of these, the standard used to specify the validity of a correction candidate is, for example, a similarity indicating the degree to which the correction candidate is similar to intermediate data acquired in a preceding process, or a similarity indicating the degree to which the correction candidate is similar to a character string inputted by the user as a revision. Also, the standard used to specify the degree of validity of a conversion candidate is, for example, a value indicating the degree to which the conversion candidate agrees with a regularity extracted from a data group included in the class of the conversion candidate.

The display control unit 107 causes various information to be displayed on the display unit 16 (see FIG. 2). For example, the display control unit 107 controls the display of a user interface on the display unit 16 as a display device. The user interface to be displayed on the display unit 16 may be displayed by launching user-oriented, specialized application software preinstalled in the user terminal 10. The user interface may also be displayed by accessing a user-oriented, specialized website.

The display control unit 107 controls the display, on the user interface, of processing result information acquired by the processing result acquisition unit 102 and stored in a database. Specifically, the display control unit 107 controls the display, on the user interface, of processing result information about individual processes included in the OCR processes and stored in the processing result DB 132 of the storage unit 13. The processing result information displayed on the user interface includes information containing multiple items. Note that a specific example of the user interface on which the processing result information is displayed will be described later with reference to FIG. 9.

In addition, the display control unit 107 controls the display, on the user interface, of progress information generated by the progress information generation unit 104. Specifically, the display control unit 107 controls the display of a list of progress information about individual processes for some or all of the two or more processes included in the OCR processes. The display control unit 107 also controls the display, on the user interface, of progress information about processes related to an item selected by a user input operation. In this case, the display control unit 107 may cause the progress of processes unrelated to the selected item to not be displayed on the user interface. Note that a specific example of the user interface on which the list of progress information about individual processes is displayed will be described later with reference to FIGS. 10 and 11.

In addition, the display control unit 107 may control the display of progress information about individual processes among two or more processes leading up to a processing result such that the progress information is displayed separately for each individual process. In this case, the display control unit 107 may receive an addition input operation from the user and cause the display to change from a screen indicating the progress of individual processes displayed on the user interface to a screen indicating the progress of the processes immediately before or immediately after the individual processes.

Additionally, the display control unit 107 controls the display, on the user interface, of the progress of a process inferred to be problematic on the basis of a predetermined standard as the progress information with an appearance that is distinguishable from the progress of other processes. The "predetermined standard" is not particularly limited and may be based on a threshold value or the like set by a user input operation, for example. The display control unit 107 also controls the display, on the user interface, of one or more character strings (hereinafter referred to as "correction candidates") which are candidates for one or more corrections as the progress information about the correction process. As another example, the display control unit 107 controls the display, on the user interface, of one or more character strings (hereinafter referred to as "conversion candidates") which are candidates for one or more conversions as the progress information about the conversion process. Note that the correction candidates and the conversion candidates are extracted by the candidate extraction unit 105 described later on the basis of a predetermined standard.

The display control unit 107 controls the display, on the user interface, of an indication of the validity of a correction candidate or a conversion candidate specified by the validity specification unit 106. The appearance of the "indication of the validity" is not particularly limited, and may be any appearance enabling the user to recognize the validity of a correction candidate or a conversion candidate at a glance. For example, an appearance displayed using colors, numerals, or the like may be adopted. The display control unit 107 also controls the display, on the user interface, of the progress of a correction control process by the CPU and the progress of a revision process for replacement with a character string inputted by a user input operation as the progress information of the correction process, in which the progress of each process is displayed with an appearance that is distinguishable from the other.

The transmission and reception control unit 108 controls the transmission and reception of various information through the communication unit 14 (see FIG. 2). The transmission and reception control unit 108 functions in the case where the management server 30 or another external server or the like not illustrated performs some of the processes by the user terminal 10. As an example, suppose that the user terminal 10 performs a process of reading character information formed on a medium such as paper, and the management server 30 performs a process of converting the character information read by the user terminal 10 into data. In this case, the transmission and reception control unit 108 controls the transmission of character information read under control by the OCR control unit 101 to the management server 30 as read information, and also controls the reception of processing result information, progress information, and the like transmitted from the management server 30.

(Functional Configuration of Control Unit in Management Server)

Figure 5:
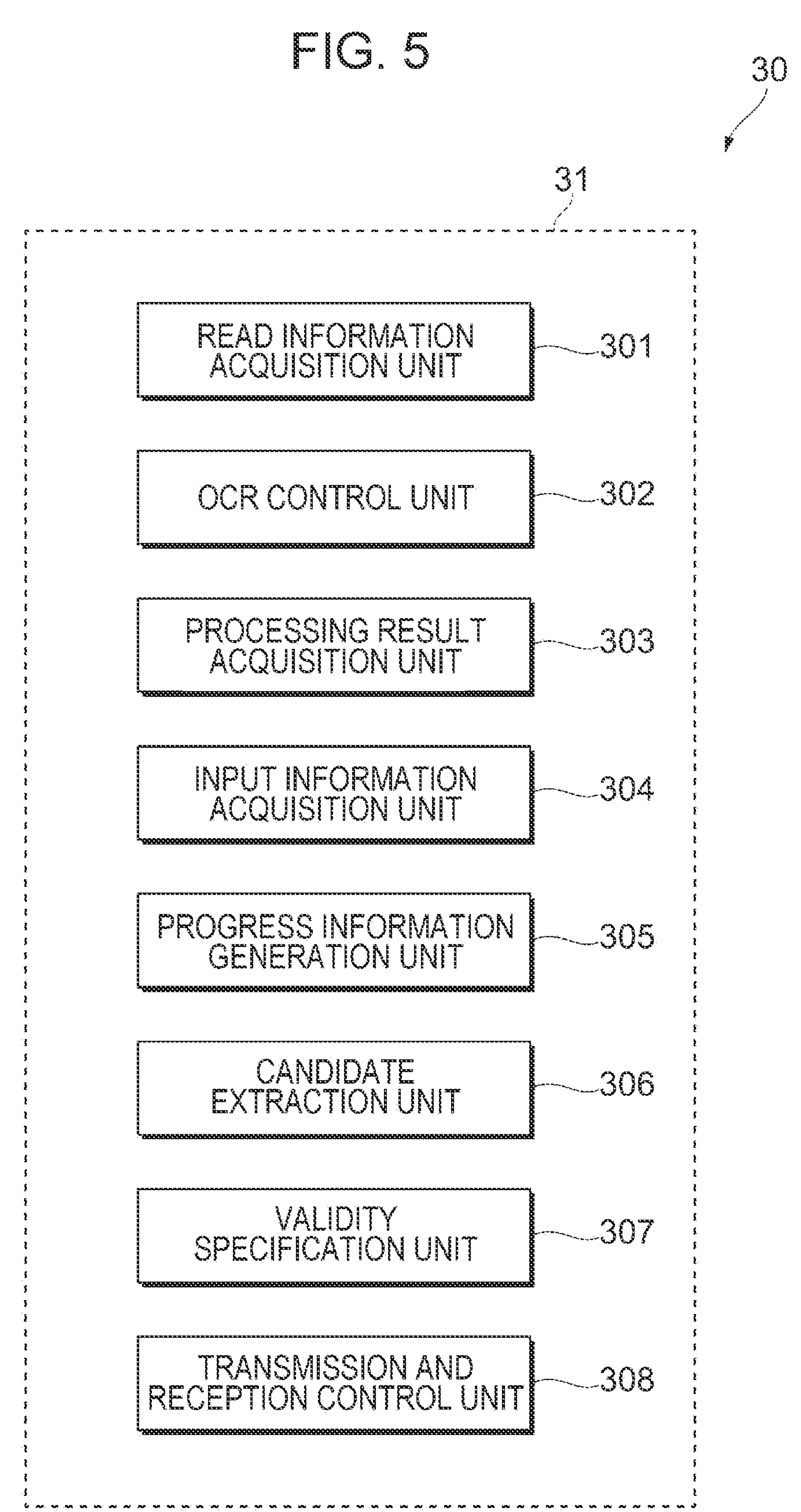
FIG. 5 is a diagram illustrating an example of a functional configuration of a control unit in a management server in a case where the management server performs some of the processes by a user terminal.

FIG. 5 is a diagram illustrating an example of a functional configuration of the control unit in the management server 30 in a case where the management server 30 performs some of the processes by the user terminal 10. In the case where the management server 30 performs some of the processes by the user terminal 10, the control unit of the management server 30 functions as a read information acquisition unit 301, an OCR control unit 302, a processing result acquisition unit 303, an input information acquisition unit 304, a progress information generation unit 305, a candidate extraction unit 306, a validity specification unit 307, and a transmission and reception control unit 308. Note that, of the above, the functions of each of the OCR control unit 302, the processing result acquisition unit 303, the progress information generation unit 305, the candidate extraction unit 306, and the validity specification unit 307 are similar to the functions of each of the OCR control unit 101, the processing result acquisition unit 102, the progress information generation unit 104, the candidate extraction unit 105, and the validity specification unit 106 in FIG. 3, and a description will be reduced or omitted.

The read information acquisition unit 301 acquires read information transmitted from the user terminal 10 and received under control by the transmission and reception control unit 308. The input information acquisition unit 304 acquires input information with respect to processing result information, the input information being transmitted from the user terminal 10 and received under control by the transmission and reception control unit 308. The transmission and reception control unit 308 controls the transmission and reception of various information through the communication unit 34 (see FIG. 3). As an example, suppose that the user terminal 10 performs a process of reading character information formed on a medium (for example, a form or the like) such as paper, and the management server 30 performs a process of converting the character information read by the user terminal 10 into data. In this case, the transmission and reception control unit 308 controls the reception of the read information transmitted from the user terminal 10 and controls the transmission of processing result information to the user terminal 10. Additionally, the transmission and reception control unit 308 controls the reception of input information with respect to the processing result information, the input information being transmitted from the user terminal 10, and controls the transmission of generated progress information to the user terminal 10.

(Flow of Processes in User Terminal)

FIG. 6 is an example of a flowchart illustrating a flow of processes in the user terminal 10. The user terminal 10 executes OCR processes (step 601) and outputs processing result information (step 602). If an input operation for launching application software is performed (step 603, YES), the user terminal 10 receives the input operation (step 604) and displays a user interface (step 605) on the display unit 16 (see FIG. 2). In contrast, if an input operation for launching application software is not performed (step 603, NO), the user terminal 10 repeats step 603 until an input operation for launching application software is performed.

The user terminal 10 display processing result information on the user interface (step 606). If an input operation for selecting information about one or more items for which progress information is to be generated from among information about multiple items included in the processing result information displayed on the user interface is performed (step 607, YES), the user terminal 10 receives the input operation (step 608) and generates progress information according to the input information (step 609). In contrast, if an input operation for selecting information about one or more items for which progress information is to be generated is not performed (step 607, NO), the user terminal 10 repeats step 607 until an input operation is performed.

If the progress information generated in step 609 includes the progress of a process inferred to be problematic on the basis of a predetermined standard (step 610, YES), the appearance of the progress information is changed such that the progress of the process inferred to be problematic is distinguishable from the progress of other processes (step 611), and the progress information is displayed on the user interface (step 612). In contrast, if the progress information does not include the progress of a process inferred to be problematic on the basis of a predetermined standard (step 610, NO), the flow proceeds to step 612.

If an input operation for correcting a result of a process and a definition used in each process included in the OCR processes is performed (step 613, YES), the user terminal 10 receives the input operation (step 614) and makes the correction (step 615). Thereafter, in response to a user input operation, the OCR processes are re-executed from the processes related to the correction (step 616). In contrast, if an input operation for correcting a result of a process and a definition used in each process included in the OCR processes is not performed (step 613, NO), the user terminal 10 repeats step 613 until the input operation is performed.

(Flow of Processes in Management Server)

Figure 7:
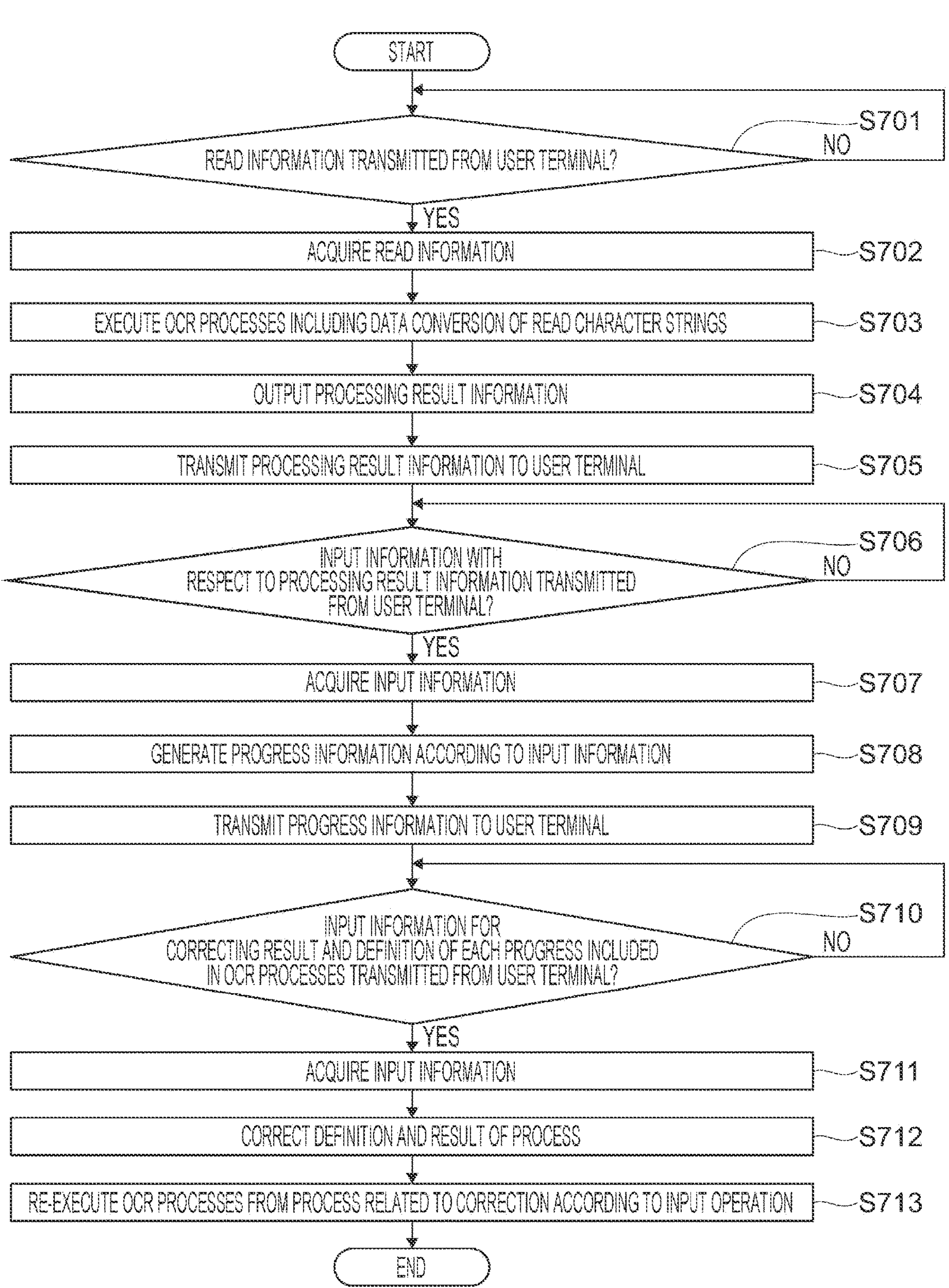
FIG. 7 is an example of a flowchart illustrating the flow of processes in a management server in a case where the management server performs some of the processes by a user terminal.

FIG. 7 is an example of a flowchart illustrating the flow of processes in the management server 30 in a case where the management server 30 performs some of the processes by the user terminal 10.

If read information is transmitted from the user terminal 10 (step 701, YES), the management server 30 acquires the read information (step 702) and executes OCR processes including the conversion of read character strings into data (step 703). Thereafter, the management server 30 outputs processing result information (step 704). In contrast, if read information is not transmitted (step 701, NO), the management server 30 repeats step 701 until read information is transmitted.

The management server 30 transmits the processing result information outputted in step 704 to the user terminal 10 (step 705). If input information with respect to the processing result information is transmitted from the user terminal 10 (step 706, YES), the management server 30 acquires the input information (step 707) and generates progress information according to the input information (step 708). In contrast, if input information with respect to the processing result information is not transmitted (step 706, NO), the management server 30 repeats step 706 until input information with respect to the processing result information is transmitted.

The management server 30 transmits the progress information outputted in step 708 to the user terminal 10 (step 709). If input information for correcting a result of a process and a definition used in each process included in the OCR processes is transmitted from the user terminal 10 (step 710, YES), the management server 30 acquires the input operation (step 711) and makes the correction (step 712). Thereafter, in response to input information inputted by the user, the OCR processes are re-executed from the processes related to the correction (step 713). In contrast, if input information for correcting a result of a process and a definition used in each process included in the OCR processes is not transmitted (step 710, NO), the management server 30 repeats step 710 until the input information is transmitted.

(Specific Example)

FIG. 8 is a diagram illustrating a specific example of a service to which an exemplary embodiment of the present disclosure is applied. In FIG. 8, the area above the dashed line represents the cloud, and the area below the dashed line represents on-premises. As illustrated in FIG. 8, a service to which an exemplary embodiment of the present disclosure is applied (hereinafter referred to as "the service") is achieved by processes denoted from (1) to (10). Of these, in (1) "workflow design and operational verification", a process for establishing settings such as definitions for reading character strings formed on a medium (for example, a form or the like) such as paper, an output setting, and a workflow check setting is performed.

(1) "Workflow design and operational verification" is achieved by coordination (for example, feedback from operational verification) among (4) "form determination, confirmation, and revision", (5) "OCR conformation and revision", and (6) "workflow check" described later. In (2)

"data input", processes such as the inputting of the data to be subjected to the OCR processes are performed. The data to be subjected to the OCR processes may be inputted from a source such as a cloud storage service, a multi-function printer (MFP), a scanner, or a web browser in some cases, and may be inputted from an external system through an application programming interface (API) in other cases.

In (3) "classification, OCR", processes such as the classification of the inputted data for determining which pages correspond to which forms or the like, the reading and extraction of character information, and the like are performed by an OCR engine on the basis of design data set in (1) "workflow design and operational verification". In (4) "form determination, confirmation, and revision", processes such as the division of the data into forms based on the results of the classification in (3) "classification, OCR", the presentation of the division results to the user, and the revision of the divisions into a correct state are performed.

In (5) "OCR confirmation and revision", processes such as the presentation of character information extracted in (3) "classification, OCR" to the user, the revision of the character information into a correct state, and the sending back of the character information are performed. Also, in (5) "OCR confirmation and revision", processes such as the cross-checking of extracted, confirmed, and revised results against data stored in a predetermined database, the displaying of data corrected as a result of the cross-checking to the user, the detection of laborious tasks and errors related to confirmation and revision, and the previewing of substitution results are performed.

In (6) "workflow check", processes such as the checking of the processing results from (5) "OCR confirmation and revision" and error detection based on a workflow check setting defined in (1) workflow design and operational verification, the notification to the user about errors, and the correction and sending back of data by the user are performed. In (7) "data output", processes such as the generating and outputting of data that is finally outputted according to an output setting defined in (1) "workflow design and operational verification" on the basis of the processing results from the (1) to (6) above are performed. The data outputted in (7) "data output" includes data outputted to a workflow system managed in a cloud environment or a cloud storage service, data outputted to an external system through an API, data outputted through a web user interface to a workflow system managed in an on-premises environment, and the like.

In (8) "send-back", processes such as the sending back of data to a previous stage as part of the checking performed in the processes of (5) and (6) are performed. In (8) "send-back", data may be escalated if the user is unable to make a decision, and processes may be re-executed if an error is detected in the processes of (4), for example. In (9) "workflow management", processes to which an exemplary embodiment of the present disclosure is applied, such as the management and execution of websites (tenants), workspaces, and jobs, are performed. In (10) "DB" (database), defined data and saved data such as processing results are stored and managed.

FIGS. 9 to 14 are diagrams illustrating a specific example of a user interface displayed on the display unit 16 of the user terminal 10 as a display device. As one example, FIG. 9 illustrates a user interface on which processing result information is displayed. The processing result information is acquired in units of jobs in the OCR processes. "Jobs" are the units of process execution. The processes included in the OCR processes are managed in units of jobs. In the processing result information for each job, the targets of reading or data conversion are recorded in respective records. "Records" are the units into which one or multiple forms inputted as a job are divided for each form. For example, if a single job contains the data for three forms, three records are generated.

Figure 10:
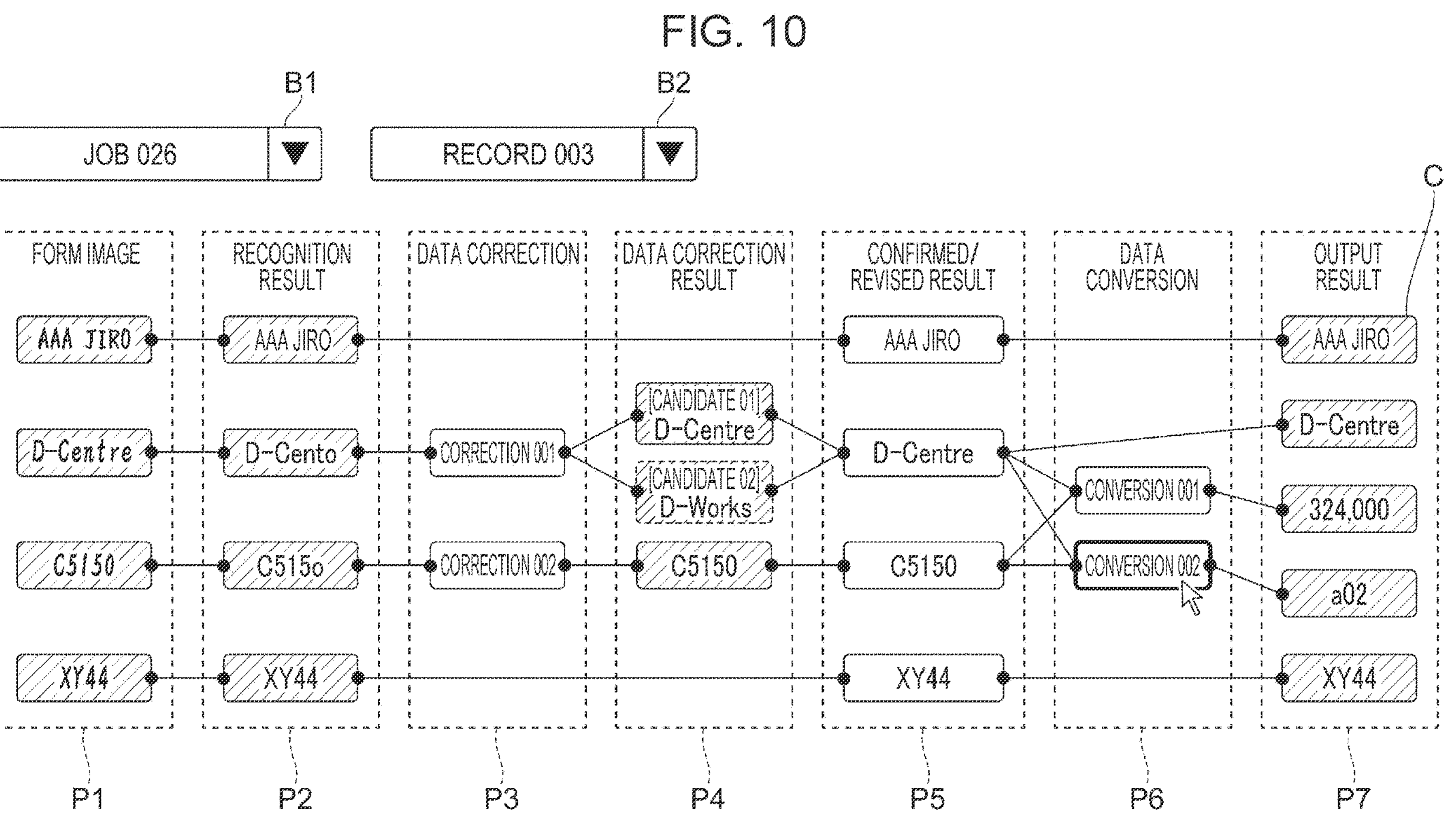
FIG. 10 is a diagram illustrating a specific example of a user interface displayed on a display unit of a user terminal as a display device.

The processing result information of the job (job 026) illustrated in FIG. 9 contains five records (records 001 to 005) for one form. Also, the targets of reading or data conversion in each record are "Name" (a name), "Product" (a product name), "Price" (a price), "Code-1" (a product code 1), and "Code-2" (a product code 2). Of these, "Code-1" (product code 1) is "XP00102" in record 001, "XP11099" in record 002, "a02" in record 003, "XP2534" in record 004, and "XP12334" in record 005, with the record 003 having an unnatural value. In this case, the user performs an operation (for example, a touch or click operation) for selecting the cell where the unnatural value (a02) is displayed. The example of FIG. 9 assumes that an operation for selecting the shaded cell has been performed. Thereafter, progress information about the record 003 corresponding to the selected cell is displayed on the user interface. FIG. 10 illustrates one such example.

FIG. 10 illustrates a specific example of a user interface on which progress information is displayed. On the user interface illustrated in FIG. 10, progress information is displayed for the record 003 selected as an unnatural value from among the processing result information in the job 026 in FIG. 9 described above. The progress information illustrated in FIG. 10 is displayed with the job and record in a selected state, but by pressing a drop-down button B1, the user is able to switch to another job, and by pressing a drop-down button B2, the user is able to switch to another record. Also, in the example of FIG. 10, only the shaded cells C are user-modifiable. The user performs an operation for selecting a desired cell C to confirm or revise from among the shaded cells C.

In the example of FIG. 10, the OCR processes include processes from P1 to P7. In the areas bounded by dashed lines indicating each of the processes from P1 to P7, one or more cells containing information indicating the result or content of an individual process are arranged. For example, in "Form Image" (process P1), "AAA Jiro", "D-Centre", "C5150", and "XY44" are indicated in a typeface illustrated in FIG. 10. Also, in "Recognition Result" (process P2), "AAA Jiro", "D-Cento", "C515o", and "XY44" are indicated in a typeface illustrated in FIG. 10.

Also, in "Data Correction" (process P3), it is indicated that a data correction (correction 001) to "D-Cento" and a data correction (correction 002) to "C515o" have been applied. In addition, in "Data Correction Result" (process P4), it is indicated that for "D-Cento", two candidates (candidate 01 "D-Centre" and candidate 02 "D-Works") have been extracted and the candidate 01 "D-Centre" has been selected from the two. Also, the selected candidate (candidate 01) and the non-selected candidate (candidate 02) are displayed in a distinguishable way. Note that in the example of FIG. 10, the non-selected candidate (candidate 02) is obscured as a way of making the appearance distinguishable. Also, it is indicated that "C515o" has been corrected to "C5150".

Next, in "Confirmed/Revised Result" (process P5), "AAA Jiro", "D-Centre", "C5150", and "XY44" are indicated in a typeface illustrated in FIG. 10. Also, in "Data Conversion" (process P6), it is indicated that data conversion (conversion 001 and conversion 002) for "D-Centre" and data conversion (conversion 001 and conversion 002) for "C5150" have been applied. Additionally, in "Output Result" (process P7), "AAA Jiro", "D-Centre", "324,000", "a02", and "XY44" are indicated in a typeface illustrated in FIG. 10. The content contained in the cells C displayed in "Output Result" (process P7) is the content of the record 003 in the processing result information in FIG. 9 described above. At this point, "a02" selected as an unnatural value may also be displayed in a distinguishable way. For example, properties such as the color of the characters, the weight of the characters, the color of the cell C, and the thickness of the border around the cell C may be changed to make the appearance distinguishable.

In addition, at least one of a possibility that a processing issue has occurred or a possibility that a processing issue has not occurred, may also be expressed in a visually distinguishable way as the progress information. Note that in the present exemplary embodiment, the possibility that an issue has occurred and the possibility that an issue has not occurred may be distinguishable by a value (hereinafter referred to as the "similarity") indicating the degree to which the character strings subjected to reading or data conversion are similar to each other.

The cells C related to the derivation of "a02" in "Output Result" (process P7) selected as an unnatural value from among the processing result information in FIG. 9 described above are the following five cells: "correction 001" and "correction 002" in "Data Correction" (process P3), "D-Centre" and "C5150" in "Confirmed/Revised Result" (process P5), and "conversion 002" in "Data Conversion" (process P6). Of these, the similarity may be calculated for the four cells C ("correction 001", "correction 002", "D-Centre", and "C5150") other than "conversion 002" directly linked to "a02" in "Output Result" (process P7) by using the Levenshtein distance between "Recognition Result" (process P2), "Data Correction Result" (process P4), and "Confirmed/Revised Result" (process P5), for example, and if the difference in similarity is within a fixed range, a "low possibility of an issue" may be determined and the cells C may be displayed in a distinguishable way to indicate the determination result. For example, although not illustrated in the diagram, different colors or the like may be applied to the cells C.

Figure 11:
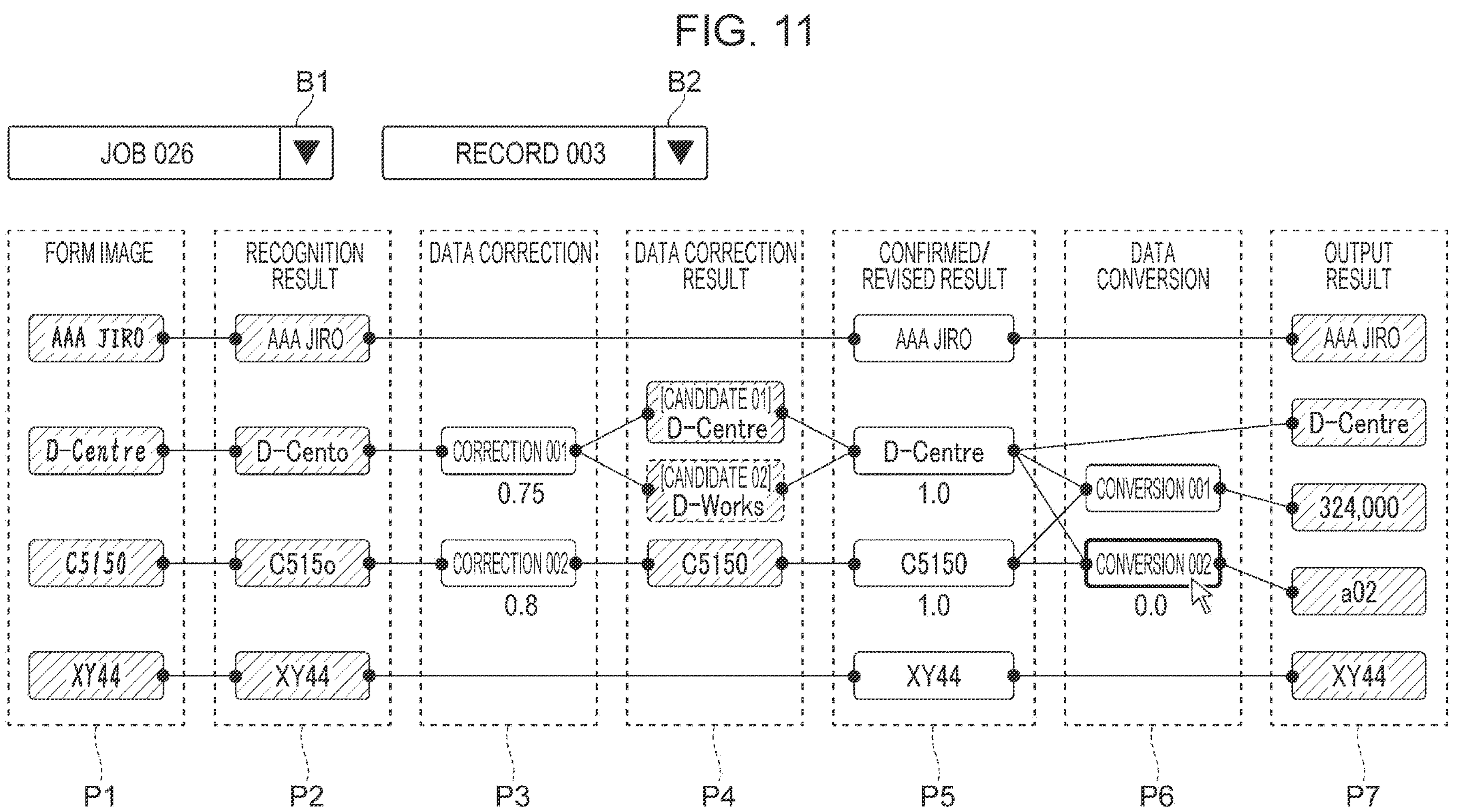
FIG. 11 is a diagram illustrating a specific example of a user interface displayed on a display unit of a user terminal as a display device.

Also, in "Data Conversion" (process P6), properties such as the difference in regularity with respect to adjacent values in the conversion table are considered when the similarity is calculated. If the calculated similarity is low, the cells C may be displayed in a distinguishable way to indicate a high possibility that an issue has occurred. For example, although not illustrated in the diagram, different colors or the like may be applied to the cells C. Moreover, the similarity may also be displayed together with the cells C. FIG. 11 illustrates one such example.

In the case where the calculated similarity is displayed together with the cells C, the similarity may be expressed as a numerical value from 0 to 1, as illustrated in FIG. 11, for example. In this case, the similarity may be expressed such that a value closer to "0" means "abnormal" and a value closer to "1" means "normal", for example. In the example of FIG. 11, a similarity of "0.75" is displayed together with "correction 001" and a similarity of "0.8" is displayed together with "correction 002" in "Data Correction" (process P3), while a similarity of "1.0" is displayed together with "D-Centre" and a similarity of "1.0" is displayed together with "C5150" in "Confirmed/Revised Result" (process P5). Additionally, a similarity of "0.0" is displayed together with "conversion 002" in "Data Conversion" (process P6).

Note that the above illustrates an example in which candidate 01 "D-Centre" is selected from the two candidates in "Data Correction Result" (process P4) and the display of the non-selected candidate 02 "D-Works" is obscured, but in some cases, none of the candidates may be selected because of defects or the like. In this case, although not illustrated in the diagram, the display is obscured for all of the candidates, but looking at "Confirmed/Revised Result" (process P5) reveals that a revision has been made by a user input operation. Accordingly, it is possible to detect that "Data Correction" (process P3) is not functioning with the intended accuracy.

In the present exemplary embodiment, the similarity described above is used as logic for determining validity. As an example, assume that a formula for calculating similarity using the Levenshtein distance has been predefined as "similarity=1−Levenshtein distance÷number of characters in longer character string". Further, assume that a threshold value has been set such that the cells C are displayed with a red color to indicate low similarity if the similarity is greater than 0 and less than 0.4, and are displayed with a green color to indicate high similarity if the similarity is equal to or greater than 0.4 and less than 0.7.

In this case, the validity of "correction 001" in "Data Correction" (process P3) is specified as follows. Namely, the similarity between "D-Cento" in "Recognition Result" (process P2) and candidate 01 "D-Centre" in "Data Correction Result" (process P4) is "0.75" (1−2÷8=0.75), and the similarity between candidate 01 "D-Centre" in "Data Correction Result" (process P4) and "D-Centre" in "Confirmed/Revised Result" (process P5) is "1.0" (1−0÷8=1.0). Since the similarities are both equal to or greater than 0.7, the cells are colored green to indicate high similarity. As a result, a "high" validity is specified.

Also, the validity of "correction 002" in "Data Correction" (process P3) is specified as follows. Namely, the similarity between "C515o" in "Recognition Result" (process P2) and "C5150" in "Data Correction Result" (process P4) is "0.8" (1−1÷5=0.8), and the similarity between "C5150" in "Data Correction Result" (process P4) and "C5150" in "Confirmed/Revised Result" (process P5) is "1.0" (1−0÷5=1.0). Since the similarities are both equal to or greater than 0.7, the cells are colored green to indicate high similarity. As a result, a "high" validity is specified.

The above logic used to specify the validity may be predefined for each table or determined according to properties such as the type of character string. In addition, multiple checks may be executed, and the check result for which the data with the highest regularity is extracted may be adopted. Also, in cases where there are few data items, the threshold value may be varied depending on the number of data items. This is because if there is only a tiny number of data items, such as "3" for example, even if two out of the three data items match, the similarity would only be "0.67" and not considered valid.

In the example illustrated in FIGS. 10 and 11 described above, the cells C of all processes are displayed on the user interface as progress information about the record 003 selected as an unnatural value from the processing result information in FIG. 9, but it is also possible to display, on the user interface, only the cells C of processes that are related to "a02" in "Output Result" (process P7) selected by a user input operation. FIG. 12 illustrates a specific example of the user interface in this case. To display, on the user interface, only the cells C related to "a02" in "Output Result" (process P7), a check button B3 labeled "Display only processes related to selected output result" is pressed, as illustrated in FIG. 12.

If an operation (for example, a touch operation or a click operation) for selecting the cell C of "conversion 002" in "Data Conversion" (process P6) from among the cells C displayed on the user interface illustrated in FIG. 12 is performed, a user interface for correcting the result of the process and the definition used in the process is displayed. FIG. 13 illustrates a specific example of the user interface in this case.

A drop-down button B11 is disposed in a display area A1 of the user interface illustrated in FIG. 13. The drop-down button B11 is a button for selecting a processing result to be corrected from among processing results of the data conversion process displayed in a drop-down list. Note that in the example of FIG. 13, an operation for selecting the cell of "conversion 002" in FIG. 12 described above has been performed, and therefore "conversion 002" is automatically selected as the initial value for the drop-down button B11.

Also, in a display area A2, a part of the progress information in FIG. 12 described above and a derivation path are displayed as information for assisting the user. Also, in a display area A3, conversion tables T1 and T2 used in "Data Conversion" (process P6) are displayed. Of these, the conversion table T1 is a table associating "product name" with "code table", and has the table name "table01". Also, the conversion table T2 is a table associating "serial number" with "product code", and has the table name "List02". Note that the conversion tables T1 and T2 are stored and managed in the character string DB 131 of the storage unit 13.

The buttons B12 and B13 labeled "Correct" which are displayed to the right of each of the conversion tables T1 and T2 are buttons displayed beside the related character string from the record 003 selected as an unnatural value. With this arrangement, the user is able to smoothly perform operations only where correction is warranted, without performing unnecessary operations. In this case, the user looks at the displayed conversion table T2 to confirm that the product code associated with the serial number "C5150" is incorrect, and presses the button B13 for correcting the product code. Thereafter, although not illustrated, an input field for individually editing the product codes stored in the conversion table T2 is displayed, and if the user inputs the correct character string "XP2459", for example, "a02" is corrected to "XP2459".

Figure 14:
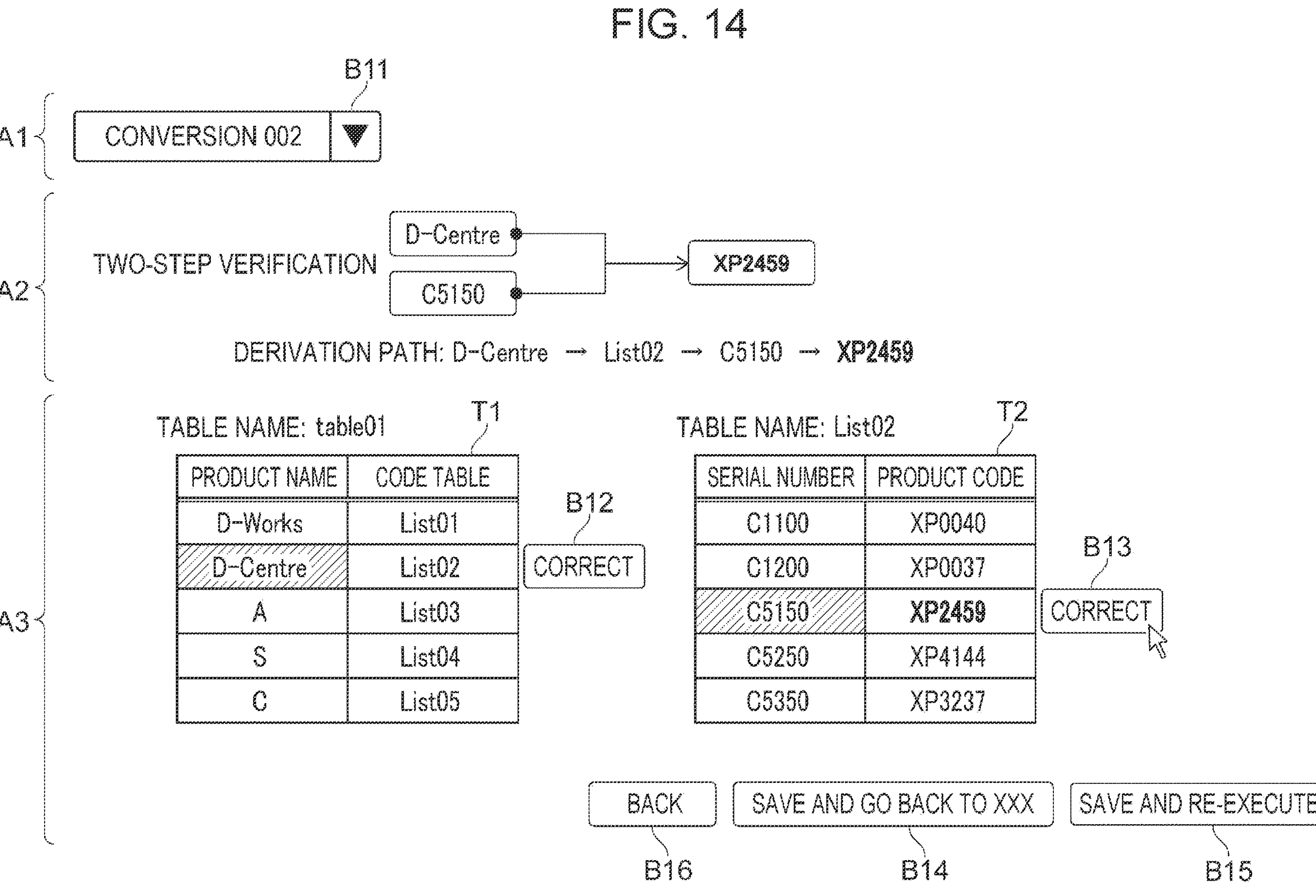
FIG. 14 is a diagram illustrating a specific example of a user interface displayed on a display unit of a user terminal as a display device.

FIG. 14 illustrates a user interface reflecting the corrected content. The corrected content is displayed such that the corrected content is distinguishable. In the example of FIG. 14, the corrected content is displayed in bold to make the corrected content distinguishable. Note that making the "corrected content distinguishable" is not limited to displaying the changed content in bold as in the example of FIG. 14, and for example, the color of the corrected content may also be changed or the cell may be highlighted. Also, in the case where the user wants to save the corrected content but not re-execute the processes, the user presses a button B14 labeled "Save and go back to XXX". Alternatively, in the case where the user wants to save the corrected content and also re-execute the processes, the user presses a button B15 labeled "Save and re-execute". In this case, although not illustrated, buttons enabling the user to select whether to undo and re-execute the existing OCR processes or launch and newly execute separate OCR processes may also be disposed. Also, in the case where the user wants to return to the user interface illustrated in FIG. 10 or 11 without saving the corrected content, the user presses a button B16 labeled "Back".

Note that the validity of "conversion 002" in "Data Conversion" (process P6) is specified as follows. In this case, "table01" is not considered because "table01" is an intermediate table for two-step verification. First, each value indicating a "product code" in the conversion table T2 (table name "List02") is checked using an algorithm regarding the regularity (degree of commonality) of character strings. For example, in the case where a longest common subsequence (LCS) algorithm is used, "XP" is extracted as a character string common to the values "XP0040", "XP0037", "XP4144", and "XP3237" indicating product codes. Furthermore, the value "a02" indicating a product code does not include the common character string "XP", and therefore "a02" is detected as an abnormal value.

The foregoing describes an exemplary embodiment of the present disclosure, but the present disclosure is not limited to the exemplary embodiment described above. Moreover, the effects produced by an exemplary embodiment of the present disclosure are not limited to those indicated in relation to the exemplary embodiment described above. For example, the configuration of the information processing system 1 illustrated in FIG. 1, the hardware configuration of the user terminal 10 illustrated in FIG. 2, and the hardware configuration of the management server 30 illustrated in FIG. 3 are all merely illustrative examples for achieving an objective of the present disclosure and are not particularly limiting. Likewise, the functional configuration of the user terminal 10 illustrated in FIG. 4 and the functional configuration of the management server 30 illustrated in FIG. 5 are merely illustrative examples and are not particularly limiting. Insofar as functionality for executing the processes described above as a whole is provided in the information processing system 1 of FIG. 1, the functional configuration to be used for achieving the functionality is not limited to the examples in FIGS. 4 and 5.

Also, the sequence in which the steps of the processes by the user terminal 10 illustrated in FIG. 6 and the steps of the processes by the management server 30 illustrated in FIG. 7 are arranged is merely an example and not particularly limiting. The processes may not only be performed in a time series following the sequence of steps illustrated in the flowcharts, but may also be performed in parallel or individually, without necessarily being performed in a time series. Moreover, the specific examples in FIGS. 8 to 14 are merely examples and are not particularly limiting.

For example, in the exemplary embodiment described above, character information is read as the OCR processes, but graphical information may also be read in addition to character information.

As another example, in FIGS. 10 to 12, the processing results from each of the processes P1 to P7 are displayed as progress information to illustrate the overall flow, including relationships between preceding and succeeding processes, but the display arrangement is not limited thereto. For example, the processing results from each of the processes P1 to P7 may also be displayed one at a time on a user interface. In this case, a predetermined operation may be performed to switch to the display of the processing result from a preceding process. The "predetermined operation" is not illustrated in the drawings, but may be an operation of pressing a button labeled "Back", for example. With this arrangement, the user is able to backtrack through and review the processing result from each process.

As another example, the above describes a case in which the cells C are colored according to similarity in the user interface illustrated in FIGS. 10 to 12, taking the example of using "red" (low similarity) and "green" (high similarity), but the display arrangement is not limited thereto. For example, multiple similarity threshold values may be set, and the cells C may be colored using three or more colors depending on the numerical value. A color indicating that the similarity is indeterminate may also be displayed. Also, the processes P1 to P7 may be displayed such that processes performed by the program and processes performed according to user input operations are distinguishable at a glance. For example, the regions bounded by the dashed lines of "Data Correction" (process P3) and "Data Conversion" (process P6), which are processes performed by the program, may be colored differently to be distinguishable from the region bounded by dashed lines of "Confirmed/Revised Result" (process P5).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:

a processor configured to:

successively execute two or more sub-processes as sub-processes in an Optical Character Recognition (OCR) process for reading character information and converting the character information into data, and thereby output final OCR processing results;

receive an operation by a user with respect to the outputted processing results;

display, on a display device and in response to the operation, a progress of the individual sub-processes among the two or more sub-processes leading up to the processing results, the progress indicating the result of each sub-process and the final OCR processing result of the OCR process, wherein the two or more sub-processes in the OCR process include at least one of:

a correction sub-process for correcting intermediate data obtained from a preceding sub-process, the display of the progress of the processes related to the correction sub-process being controlled by the processor such that one or a plurality of correction candidates are displayed; or a conversion sub-process for converting intermediate data obtained from a preceding sub-process, the display of the progress of the sub-processes related to the conversion sub-process being controlled by the processor such that one or a plurality of conversion candidates are displayed; and control the display of the progress of the correction sub-process and the conversion sub-process such that, in relation to the correction candidate and the conversion candidate, an indication of a validity of the correction candidate and the conversion candidate is displayed, the validity being determined on a basis of a predetermined standard.

2. The information processing device according to claim 1, wherein:

the processor is configured to display a list of the progress of the individual sub-processes for some or all of the two or more sub-processes in the OCR process.

3. The information processing device according to claim 2, wherein:

the processor is configured to:

output information containing a plurality of items as the final OCR processing results;

receive an operation performed by the user for selecting one of the plurality of items; and display the progress of sub-processes related to the selected item on the display device, and not display the progress of other sub-processes.

4. The information processing device according to claim 1, wherein:

the processor is configured to display the progress of individual sub-processes among the two or more sub-processes in the OCR process individually for each sub-process.

5. The information processing device according to claim 4, wherein:

the processor is configured to receive an operation by the user causing the display on the display device to change from a screen illustrating the progress of the individual sub-processes to a screen illustrating the progress of a sub-process immediately before or immediately after the individual sub-processes.

6. The information processing device according to claim 1, wherein:

the processor is configured to control the display of the progress of the sub-processes such that the progress of a sub-process inferred to be problematic on a basis of the predetermined standard is distinguishable from the progress of other sub-processes.

7. The information processing device according to claim 2, wherein:

the processor is configured to control the display of the progress of the sub-processes such that the progress of a sub-process inferred to be problematic on a basis of the predetermined standard is distinguishable from the progress of other sub-processes.

8. The information processing device according to claim 3, wherein:

the processor is configured to control the display of the progress of the sub-processes such that the progress of a sub-process inferred to be problematic on a basis of the predetermined standard is distinguishable from the progress of other sub-processes.

9. The information processing device according to claim 4, wherein:

the processor is configured to control the display of the progress of the sub-processes such that the progress of a sub-process inferred to be problematic on a basis of the predetermined standard is distinguishable from the progress of other sub-processes.

10. The information processing device according to claim 5, wherein:

the processor is configured to control the display of the progress of the sub-processes such that the progress of a sub-process inferred to be problematic on a basis of the predetermined standard is distinguishable from the progress of other sub-processes.

11. The information processing device according to claim 1, wherein:

the processor specifies the validity of the correction candidate on the basis of at least a similarity between the intermediate data obtained from a preceding sub-process and the correction candidate.

12. The information processing device according to claim 1, wherein:

the processor is configured to:

perform, as the correction sub-process, a correction in accordance with a predetermined rule, and a revision in which an input operation by the user is received and a character string in the intermediate data is replaced by the inputted character string; and specify the validity of the correction candidate on the basis of a similarity between the intermediate data obtained from a preceding sub-process and the correction candidate according to the correction, and a similarity between the intermediate data obtained from a preceding sub-process and the inputted character string inputted according to the revision.

13. The information processing device according to claim 1, wherein:

the processor is configured to:

select the conversion candidate from a data group based on a predetermined class; and specify the validity of the conversion candidate on the basis of a degree to which the conversion candidate agrees with a regularity extracted from a data group included in the class of the conversion candidate.

14. The information processing device according to claim 1, wherein:

the processor is configured to:

perform, as the correction sub-process, a correction in accordance with a predetermined rule, and a revision in which an input operation by the user is received and a character string in the intermediate data is replaced by the inputted character string; and cause the progress of the sub-processes for the correction and the progress of the sub-processes for the revision to be displayed in a distinguishable way.

15. The information processing device according to claim 1, wherein:

the processor is configured to:

execute the individual sub-processes on a basis of a predetermined definition for each sub-process; and receive, in relation to a sub-process of which the progress is displayed on the display device from among the individual sub-processes, an operation by the user on the screen illustrating the progress of the sub-process, and correct the result of the sub-process and the definition used in the sub-process.

16. The information processing device according to claim 15, wherein:

after the correction related to the sub-process is made, the processor is configured to re-execute a series of sub-processes from the sub-process related to the correction.

17. An information processing method comprising:

successively executing two or more sub-processes as sub-processes in an Optical Character Recognition (OCR) process for reading character information and converting the character information into data, and thereby outputting final OCR processing results;

receiving an operation by a user with respect to the outputted processing results;

displaying, on a display device and in response to the operation, a progress of the individual sub-processes among the two or more sub-processes leading up to the processing results, the progress indicating the result of each sub-process and the final OCR processing result of the OCR process, wherein the two or more sub-processes in the OCR process include at least one of:

a correction sub-process for correcting intermediate data obtained from a preceding sub-process, and controlling the display of the progress of the processes related to the correction sub-process such that one or a plurality of correction candidates are displayed; or a conversion sub-process for converting intermediate data obtained from a preceding sub-process, and controlling the display of the progress of the sub-processes related to the conversion sub-process such that one or a plurality of conversion candidates are displayed; and controlling the display of the progress of the correction sub-process and the conversion sub-process such that, in relation to the correction candidate and the conversion candidate, an indication of a validity of the correction candidate and the conversion candidate is displayed, the validity being determined on a basis of a predetermined standard.

18. A non-transitory computer readable medium storing a program causing a computer to execute a process comprising:

successively executing two or more sub-processes as sub-processes in an Optical Character Recognition (OCR) process for reading character information and converting the character information into data, and thereby outputting final OCR processing results;

receiving an operation by a user with respect to the outputted processing results;

displaying, on a display device and in response to the operation, a progress of the individual sub-processes among the two or more sub-processes leading up to the processing results, the progress indicating the result of each sub-process and the final OCR processing result of the OCR process, wherein the two or more sub-processes in the OCR process include at least one of:

a correction sub-process for correcting intermediate data obtained from a preceding sub-process, and controlling the display of the progress of the processes related to the correction sub-process such that one or a plurality of correction candidates are displayed; or a conversion sub-process for converting intermediate data obtained from a preceding sub-process, and controlling the display of the progress of the sub-processes related to the conversion sub-process such that one or a plurality of conversion candidates are displayed; and controlling the display of the progress of the correction sub-process and the conversion sub-process such that, in relation to the correction candidate and the conversion candidate, an indication of a validity of the correction candidate and the conversion candidate is displayed, the validity being determined on a basis of a predetermined standard.

* * * * *